April 21, 1953 J. J. JORGENSEN 2,635,402
COIN WRAPPING MACHINE
Filed June 6, 1946 6 Sheets-Sheet 1

INVENTOR
Jens Julius Jorgensen
BY Charles T French
ATTORNEYS

April 21, 1953    J. J. JORGENSEN    2,635,402
COIN WRAPPING MACHINE
Filed June 6, 1946    6 Sheets-Sheet 2

INVENTOR
Jens Julius Jorgensen
BY Quarles & French
ATTORNEYS

April 21, 1953 J. J. JORGENSEN 2,635,402
COIN WRAPPING MACHINE
Filed June 6, 1946 6 Sheets-Sheet 3

INVENTOR
Jens Julius Jorgensen
BY Charles & French
ATTORNEYS

April 21, 1953  J. J. JORGENSEN  2,635,402
COIN WRAPPING MACHINE
Filed June 6, 1946  6 Sheets-Sheet 4

INVENTOR
Jens Julius Jorgensen
BY Charles & French
ATTORNEYS

April 21, 1953  J. J. JORGENSEN  2,635,402
COIN WRAPPING MACHINE
Filed June 6, 1946  6 Sheets-Sheet 5
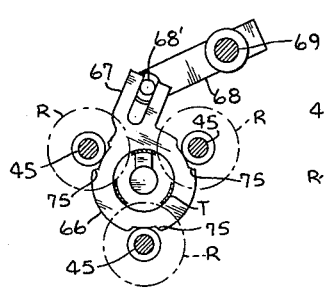
FIG. 9
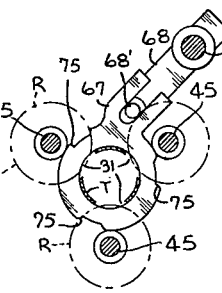
FIG. 10
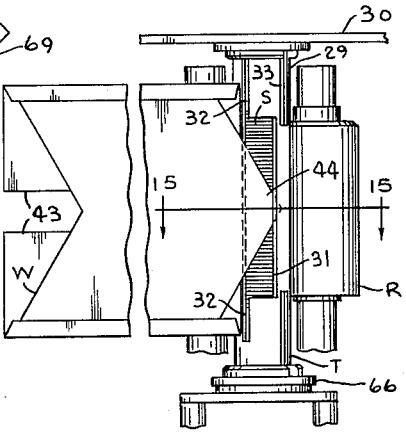
FIG. 11
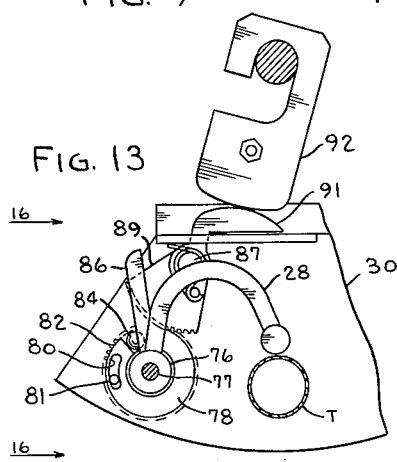
FIG. 13
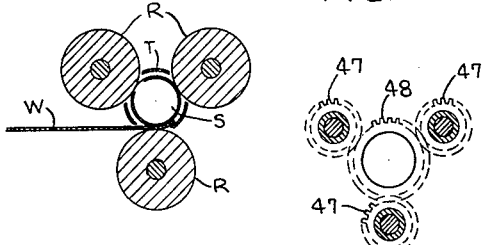
FIG. 15  FIG. 12
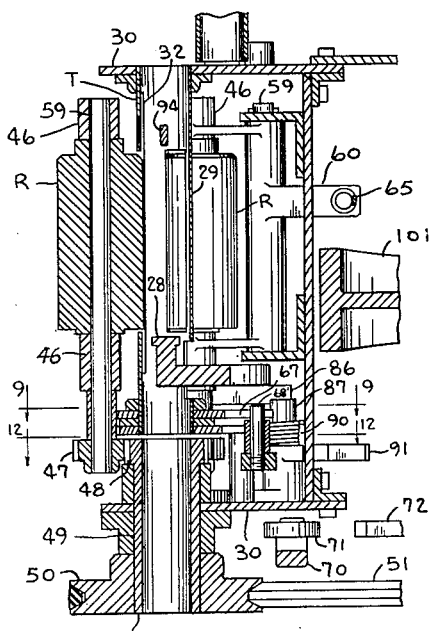
FIG. 14
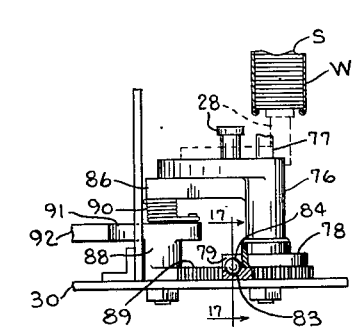
FIG. 16
FIG. 17
INVENTOR
Jens Julius Jorgensen
BY Charles & French
ATTORNEYS April 21, 1953  J. J. JORGENSEN  2,635,402
COIN WRAPPING MACHINE
Filed June 6, 1946  6 Sheets-Sheet 6

INVENTOR
Jens Julius Jorgensen
BY Quarles & French
ATTORNEYS

Patented Apr. 21, 1953

2,635,402

UNITED STATES PATENT OFFICE 2,635,402

COIN WRAPPING MACHINE

Jens Julius Jorgensen, Detroit, Mich., assignor to Brandt Automatic Cashier Company, Watertown, Wis., a corporation of Wisconsin Application June 6, 1946, Serial No. 674,822

21 Claims. (Cl. 53—113)

The invention relates to coin wrapping machines.

In the usual method of wrapping coins, the coins are introduced into a pre-formed wrapper having a closed end and the open end then crimped. Such pre-formed wrappers are objectionable as they must be made large enough to readily admit the coins with the result that the coins are not tightly bound in the wrapper and involve labor costs of handling separate wrappers. The object of this invention is to provide a coin wrapping machine in which the wrapper is fed to the machine as a blank of sheet material and wrapped by the machine around a predetermined number of coins which are fed to the wrapping mechanism as a pre-counted unit assembly of coins. More particularly, the present invention provides a machine in which the coins are fed to the machine by gravity as a pre-counted stack of coins and the wrapper blank then wrapped around, thus greatly simplifying many problems incident to the production of a practical high capacity coin wrapping machine.

The invention further consists in the several features hereinafter set forth and more particularly defined by claims at the conclusion hereof.

In the drawings:

Fig. 9 is a detailed horizontal sectional view through parts of the wrapper blank feeding mechanism of the machine taken on the line 9—9 of Fig. 14;

Fig. 10 is a view similar to Fig. 9 showing the parts thereof in non-feeding position;

Fig. 11 is a detailed front elevation view of parts of the machine with one of the wrapper blank feed rollers in a displaced position;

Fig. 12 is a detailed horizontal sectional view taken on the line 12—12 of Fig. 14;

Fig. 13 is a detailed horizontal sectional view taken on the line 13—13 of Fig. 1;

Fig. 14 is a detailed vertical sectional view taken on the line 14—14 of Fig. 2;

Fig. 15 is a detailed horizontal sectional view taken on the line 15—15 of Fig. 11;

Fig. 16 is a side elevation view looking in the direction of the arrows 16—16 shown in Fig. 13, parts being broken away and parts being shown in section;

Fig. 17 is a detailed vertical sectional view taken on the line 17—17 of Fig. 16;

Figure 22:
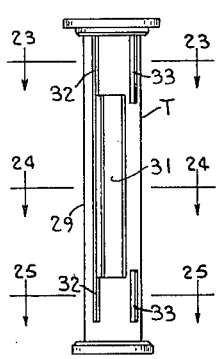
Figure 23:
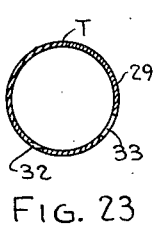
Figures 24, 25:
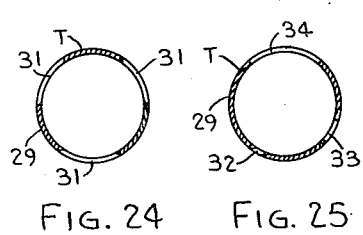
Figure 26:
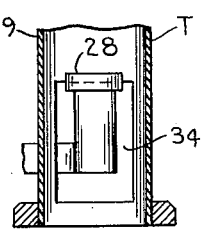

Figs. 18, 19, 20, and 21 are diagrammatic views showing the successive steps of wrapping the coins;

Fig. 22 is a detailed front elevation view of the coin and wrapper receiving tube;

Fig. 23 is a detailed horizontal sectional view taken on the line 23—23 of Fig. 22;

Fig. 24 is a detailed horizontal sectional view taken on the line 24—24 of Fig. 22;

Fig. 25 is a detailed horizontal sectional view taken on the line 25—25 of Fig. 22;

Fig. 26 is a detailed vertical sectional view through the lower end of the coin and wrapper receiving tube with the stop in an operative position.

In general the machine includes a coin and wrapper receiving tube T, means for feeding a unit assembly of a predetermined number of coins such as fifty coins of a given denomination to said tube, means for feeding a wrapper blank into said tube and wrapping the same about the coins in said tube while held by a releasable stop mechanism, means for crimping the ends of the wrapper about the wrapped coins, and means for discharging the wrapped coins from the tube.

Figure 18:
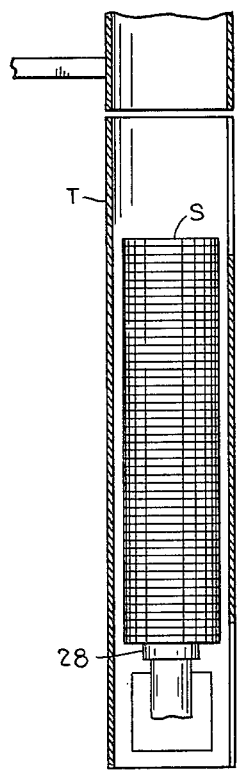
Figures 19, 20, 21:
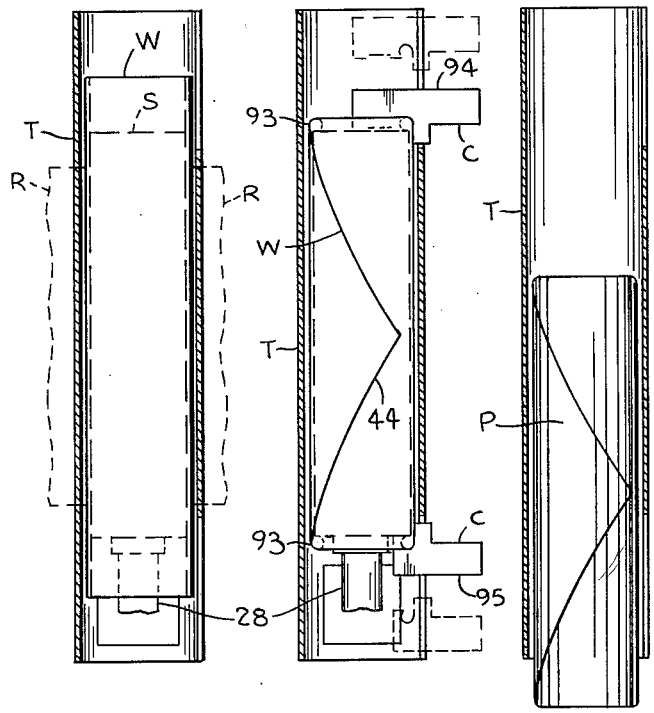

Before describing the various mechanisms in detail and referring to Figs. 18 to 21, a general description of the successive steps of wrapping the coins will be given. Referring to Fig. 18, a stack S of coins is shown as having been deposited as a pre-counted unit assembly from the feed mechanism into the coin and wrapper receiving tube T with the base of the stack resting on a releasable stop member 28. Just before the coins have been deposited in the tube or shortly after the rollers R have closed on the coins the forward end of the wrapper blank W is fed into the machine to the position shown in Figs. 11 and 15. Thereafter, the wrapper rollers R shown in Fig. 15 enter slots in the tube T and engaging both the wrapper and the coins wrap the wrapper blank W about the coins as shown in Fig. 19. When this operation is completed and with the rollers R revolving the wrapped coins, crimpers C enter the tube T and roll or spin the extended free ends of the wrapper into a rolled or crimped edge over the top and bottom coins of the wrapped stack as shown in Fig. 20. Thereafter, the crimpers C and the stop member 28 are withdrawn and the wrapped package of coins P then drops by gravity from the tube T as shown in Fig. 21.

Referring now to Figs. 22 to 26, the coin and wrapper receiving tube T includes a hollow metal tube 29 fixed at its ends (see Fig. 14) to the frame 30 of the machine. This tube has a number of slots therein, to wit a series of radially disposed relatively wide slots 31 to accommodate the wrapping rollers R, one side of one of these slots being extended by narrower slots 32 to admit the wrapper blank to the tube, crimper accommodating slots 33 at the top and bottom portions of said tube, and a stop accommodating slot 34 at the lower end of the tube.

Figure 7:
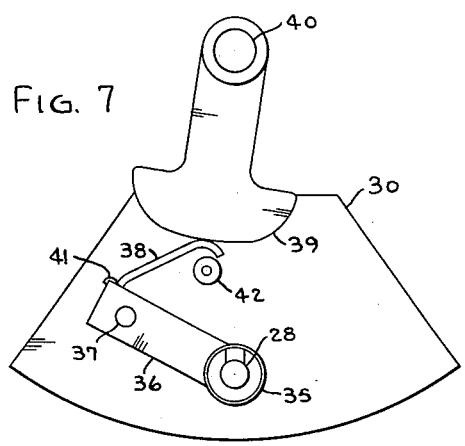
Fig. 7 is a detailed top plan view of the feeder mechanism.
Figure 6:
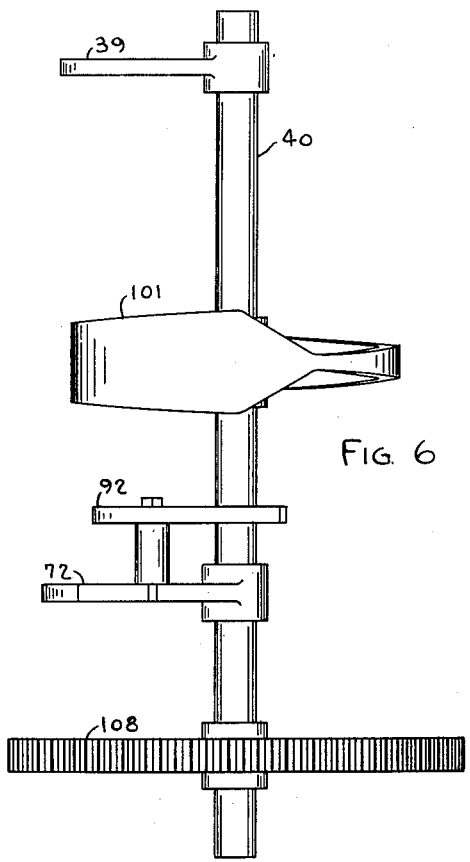
Fig. 6 is a detailed vertical sectional view taken on the line 6—6 of Fig. 3.

As noted before a pre-counted stack of coins S is introduced into the T by feeding mechanism which herein comprises an oscillatory open end coin stack receiving tube 35 (see Figs. 1, 2, and 7) which is secured to the arms of a U-shaped carrier 36 mounted to turn on a pivot shaft 37 secured to the frame 30, said carrier having a cam shoe or follower 38 secured thereto adapted to be engaged at the proper time in the cycle of operations of the machine with a cam 39 mounted on an intermediate drive shaft 40. The tube 35 is held in operative engagement with the cam 39 and normally moved to a retracted position by a torsion spring 41 anchored to the shaft 37 and bearing at its free end against the carrier 36, the carrier then engaging a fixed stop 42. The coins are fed into the tube 35 from any suitable coin counting machine and while a preceding stack of coins are being wrapped, and then the cam 39 acts to swing the tube 35 over the open upper end of the tube T and the coins drop as a unit into this tube and are positioned by the stop 28. Just before the coins are delivered to the tube T, a wrapper blank W which preferably has been cut from a continuous sheet or web into the form shown in Fig. 11 passes along through sheet guides 43, and its front pointed end 44 enters the slot formed by one of the slots 31 and the extensions 32 until its tip end enters the interior of the tube. Any suitable means may be employed for feeding the wrapper blank to the tube T operating in timed relation with this machine.

Figure 1:
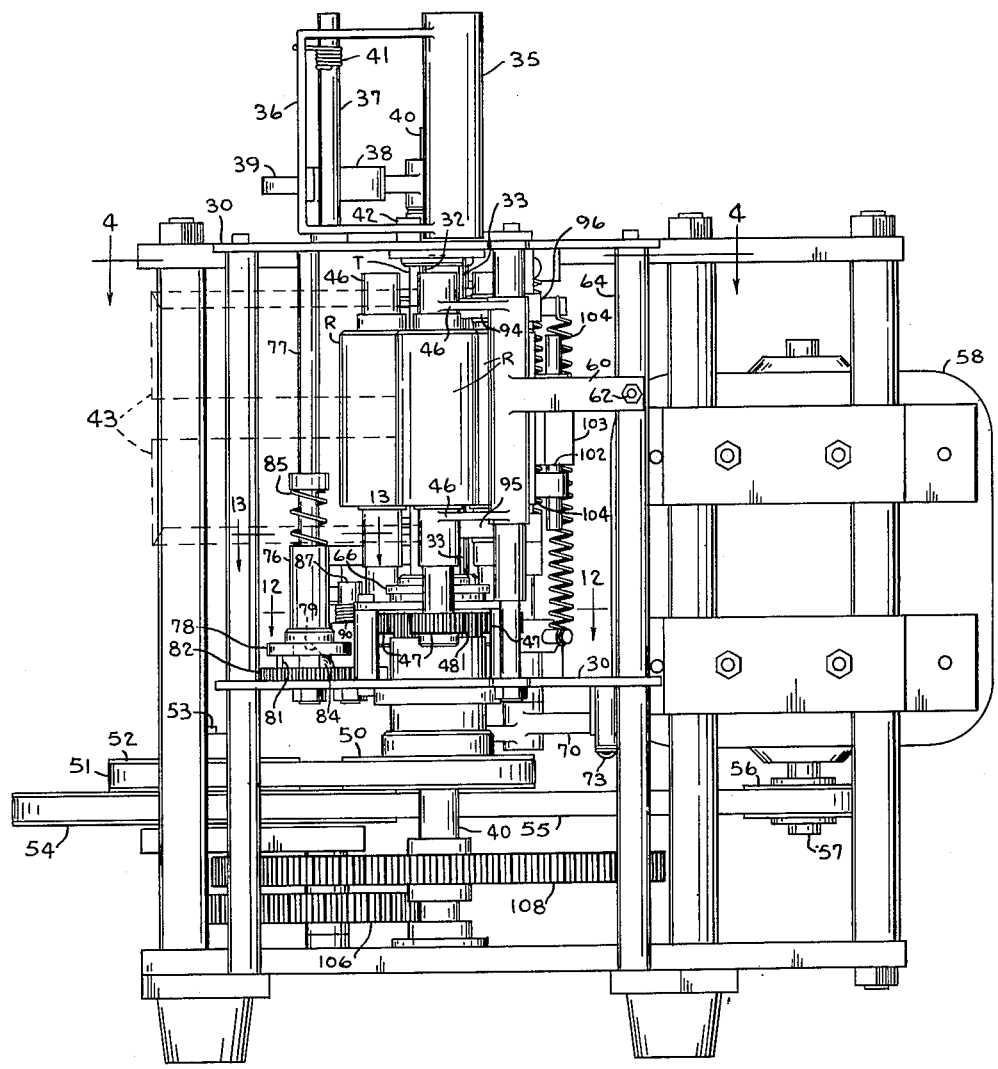
Fig. 1 is a front elevation view of coin wrapping machine embodying the invention.
Figure 2:
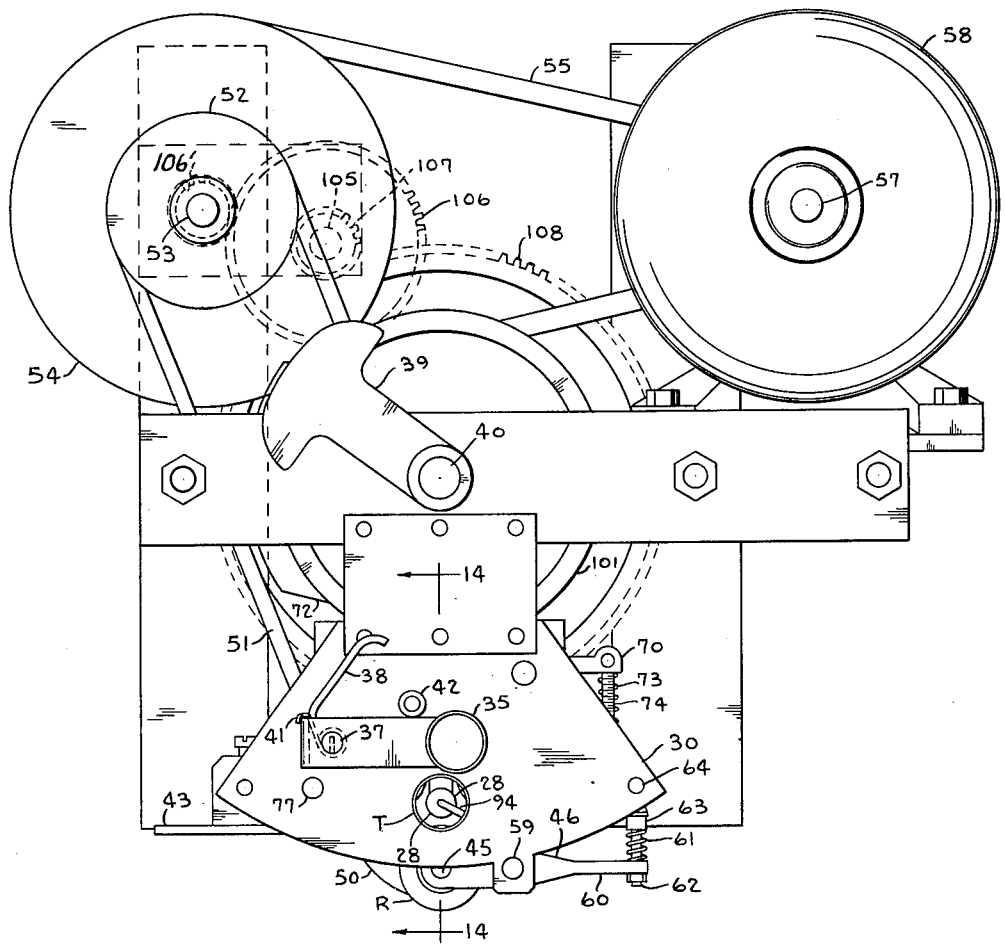
Fig. 2 is a plan view of said machine.
Figure 3:
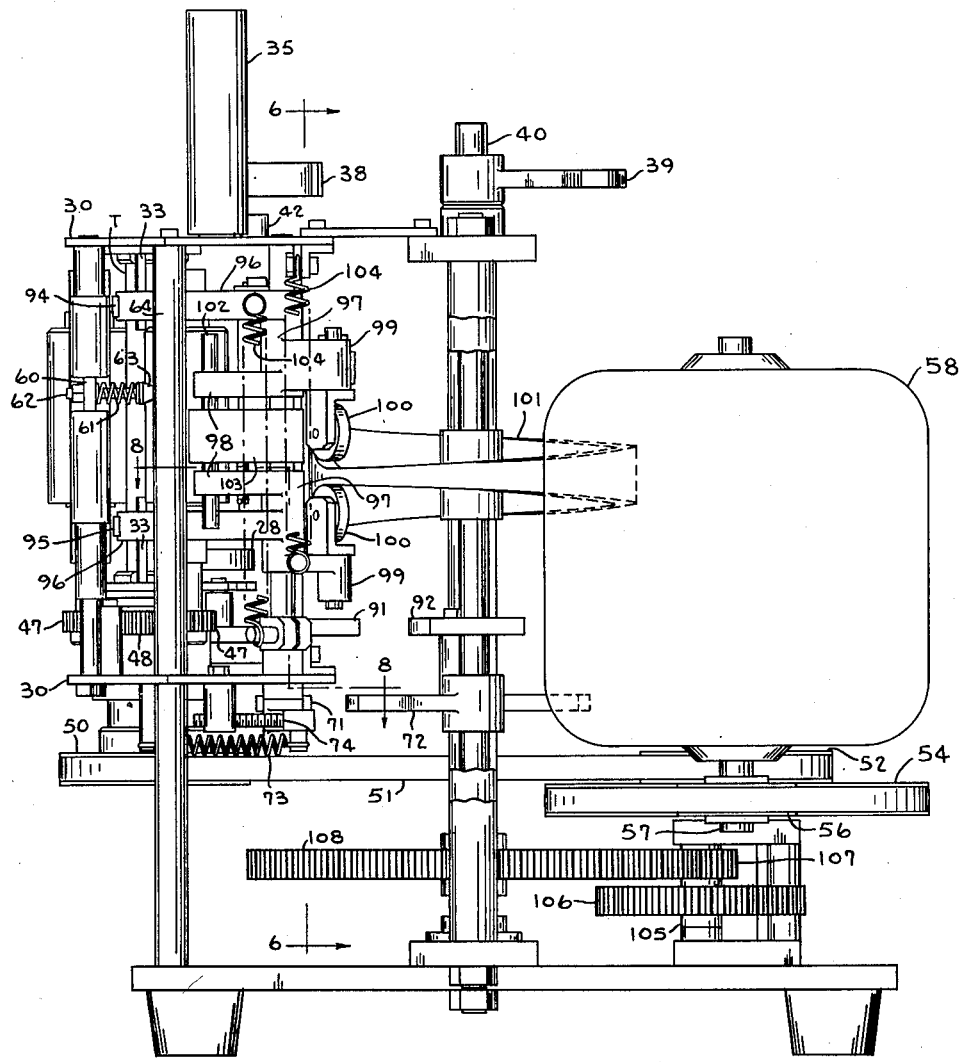
Fig. 3 is a side elevation view of the machine.
Figure 8:
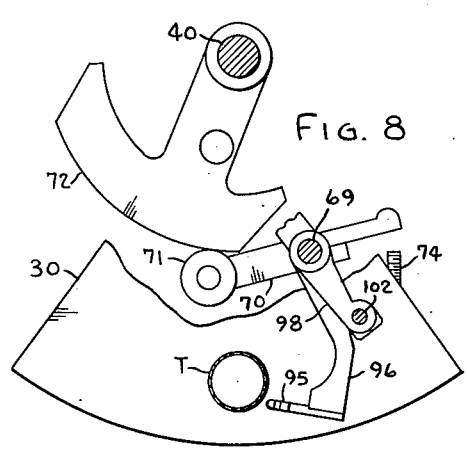
Fig. 8 is a plan view of the crimper operating mechanism.

With the wrapper in the position above noted means are provided for feeding the wrapper into the tube T between the tube and the coins and wrapping the same about the stack of coins comprising a series of rotatable and oscillatory movable rollers R. Each roller R is mounted on a shaft 45 journalled in a hanger or bracket 46 and carrying a gear 47 meshing with a drive pinion or gear 48 disposed beneath the tube T (see Figs. 1, 12, and 14) and formed integral with a tubular shaft 49 journalled in the frame 30 and carrying a pulley 50 connected by a belt 51 with a pulley 52 on a main drive shaft 53 which is connected by a pulley 54 and belt 55 to a pulley 56 on the shaft 57 of an electric motor 58 (see Figs. 2 and 3) whereby the gear 48 and the gears 47 are continuously rotated. Each hanger or bracket 46 is mounted to pivot or oscillate upon a fixed shaft 59 and has an arm 60 yieldingly engaged by a spring to constantly urge its roller R inwardly relative to the tube T. The front roller R as viewed in Fig. 1 is yieldingly urged inwardly by a spring 61 interposed between its arm 60 and a bolt 62 whose head 63 engages a frame rod 64 (see Figs. 2 and 3). A spring 65 is interposed between the arms 60 of the other two rollers to urge them inwardly (see Figs. 4 and 14). The inward movement of each roller is limited by its engagement with an oscillatory cam 66 and by which the rollers R are moved radially outwardly of the tube T, said cam 66 being mounted to turn on the lower end of the tube T (see Figs. 9, 10, and 14) and having a slotted arm or crank 67 engaged by a pin 68' on an arm 68 secured to an oscillatory shaft 69 as shown in Figs. 3 and 8. Shaft 69 has an arm 70 secured to the lower end thereof intermediate its ends, one end carrying a cam roller 71 engaged by a cam 72 on the shaft 40 and the other end normally held by a tension spring 73 against an adjustable stop screw 74. With the above construction when the wrapper blank is in the position shown in Figs. 11 and 15, the cam surfaces 75 of the cam 66 engaging the shafts 45 of the rollers R have moved said rollers outwardly to permit the wrapper blank to be started into the tube just before the coins S are deposited therein. Immediately thereafter the cam 66 releases said rollers, and the wrapper blank is then fed inwardly between the slot in the tube T and the front roller and then between the tube T, the other rollers R and the coins, the rotation of the rollers R permit this feeding action of the blank, the rollers holding the stack of coins in spaced relation with the tube T as shown in Fig. 19, until the wrapper under the pressure of the spring pressed rollers R is completely and tightly wrapped about the stack of coins.

The releasable stop mechanism for holding the coins in the tube during the wrapping operation includes the stop member 28, means for swinging said member into and out of operative relation with the coin in the tube, and means for vertically reciprocating said member relative to said tube T. The stop member 28 has a hub portion 76 mounted to turn on a fixed shaft 77 and carrying a flanged collar 78 provided with a cam or wedge surface 79 (see Figs. 13, 16, and 17) and a segmental slot 80 through which a drive pin 81 on a gear 82 also journalled on said shaft 77 projects. The gear 82 is recessed at 83 to receive a ball bearing 84 which acting on said surface 79 as the gear 82 is revolved acts to lift said stop 28 upwardly against the action of a return spring 85 engaging said hub (see Fig. 1). This lifting action of the stop 28 occurs when through the turning of the gear 82 a stop arm 86 on said stop moves into engagement with a fixed stud shaft 87 upon which the hub 88 of a segmental gear 89, meshing with the gear 82, is free to turn or swing. Swinging of the gear 89 in one direction is effected by a torsion spring 90 having one end anchored to the frame 30 and the other end connected to the hub 88 of the gear 89 in which instance said gear rotates counterclockwise as viewed in Fig. 13, thereby turning the gear 82 clockwise and causing the stop 28 first to swing inwardly through the lower end of the slot 34 until the stop arm 86 limits further inward movement and then be raised by the wedging action of the ball 84 against the action of the spring 85 until said stop 28 reaches its elevated position in dotted in Fig. 16 and in full in Figs. 18 to 20. For moving the stop out of operative position against the action of the spring 90 the hub of the gear 89 has a cam follower or shoe portion 91 adapted to be engaged at the proper time in the cycle of operation of the machine by a cam 92 mounted on the intermediate drive shaft 40. It will be noted that this cam 92 operates to withdraw the stop 28 only for a relatively brief interval required to allow the wrapped coins to be discharged from the machine as shown in Fig. 21.

After the wrapper blank has been rolled tightly about the coins, portions of this wrapper extend beyond the ends of the stack as indicated in Fig. 19, and the next step is to crimp or roll these extensions into beaded edges 93 abutting the outermost coins of the stack as shown in Fig. 20 which is done by crimping members 94 and 95, the upper crimping member 94 being longer and acting as a coin stop in conjunction with the stop 28 while the free ends of the wrapper are being rolled over and inwardly of the stack into crimped engagement therewith as the rollers R rotate the wrapped coins.

Figure 4:
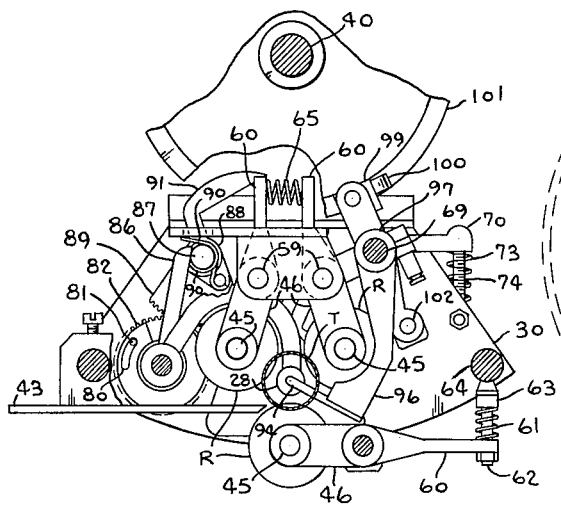
Fig. 4 is a detailed horizontal sectional view taken on the line 4—4 of Fig. 1, parts being broken away.
Figure 5:
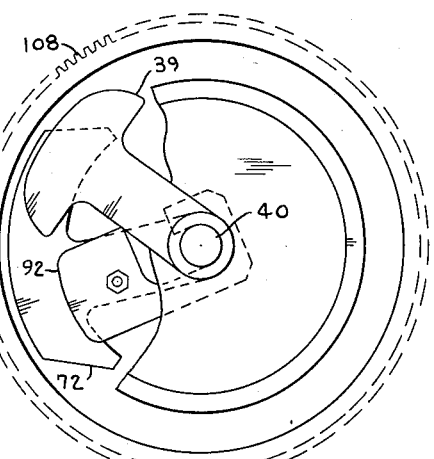
Fig. 5 is a plan view of an intermediate drive shaft of the machine with its associated cams, parts being broken away.

For accomplishing the crimping operation the members 94 and 95 are given an in and out oscillatory motion relative to the tube T and an inward and outward reciprocatory motion relative to the wrapped coins. As shown in Figs. 3, 4, and 8, each crimper is mounted on an oscillatory arm 96 whose hub 97 is free to turn about the oscillatory shaft 69 and carries a guide arm 98 and a cam follower arm 99 carrying a cam roller 100 engaging one face of a double faced cam 101 mounted on the intermediate shaft 40. The guide arms 98 are slidably guided in a straight line movement by a guide shaft or member 102 fixed to the outer end of an arm 103 fixed to the oscillatory shaft 69 which as previously noted in connection with Fig. 8 is oscillated by the engagement of the cam 72 with roller carrying arm 70 fixed to said shaft whereby the crimpers are moved radially in and out relative to the tube T. The arms 96 are constantly urged toward each other under the control of the cam 101 by a tension spring 104 for each arm connected at one end to the arm to be moved and at the other to a fixed part of the machine, the cam surfaces of the cam 101 being so designed that after crimpers 94 and 95 have been swung inwardly through the slots 33 in the tube T and shown in the dotted lines in Fig. 20, the rollers 100 ride onto the narrower section of the cam, thereby permitting the springs 104 to move the crimpers into the full line position shown in Fig. 20, and in doing so complete the crimping of the ends of the package against the outermost of the wrapped coins. The particular formation of the crimping ends of the crimpers is not new per se but is designed as noted to roll the free edges of the wrapper into a beaded coin engaging edge.

The intermediate shaft 40 is continuously rotated through a suitable gear drive connection with the drive shaft 53. As shown, this drive connection includes a reduction gear connection between the shaft 40 and a shaft 105 including a gear 106 on the shaft 105 meshing with a gear 106' on the shaft 53 and a gear 107 on the shaft 105 meshing with a gear 108 on the intermediate shaft 40. The cycle of operations of the machine is completed in one revolution of the shaft 40.

After the crimping operation, the release of the pressure of the rollers R on the wrapped package and the withdrawal of the crimpers and the stop 28 from the tube T permits the wrapped package to drop by gravity from the machine.

It will be noted that the springs 104 associated with the crimpers permit of a yielding movement of said crimpers during the crimping stroke and provide a variable stroke for said crimpers to accommodate stacks of coins of varying overall length due to the varying thicknesses of coins occasioned by wear.

Since a general description of the operation of the machine has been given and a detailed description of the operation of the parts as the successive steps of forming the wrapper have been given, further description thereof is deemed unnecessary.

I desire it to be understood that this invention is not to be limited to any particular form or arrangement of parts except in so far as such limitations are included in the claims.

What I claim as my invention is:

1. In a coin wrapping machine, the combination of a coin and wrapper receiving holder, means for introducing an unvarying predetermined number of coins as a unit into said holder, means for introducing a wrapper blank into said holder between the same and said coins and wrapping it about said unit of coins, means for crimping the ends of said wrapper against the outermost coins of said unit of coins, said crimping means being yieldable to accommodate for varying thicknesses of coins introduced as a unit into said holder, and means controlling the discharge of the packaged coins from said holder.

2. In a coin wrapping machine, the combination of a coin and wrapper receiving tube, means for introducing a predetermined number of coins as a unit into said tube, a plurality of revoluble rollers bodily movable radially inwardly and outwardly of said tube on axes parallel to the axis of said tube and cooperating with said tube and with the coins to wrap a wrapper blank about the coins in said tube, bodily movable crimpers movable radially inwardly and outwardly of said tube on axes parallel to the axis of said tube and bodily movable toward and away from each other while in said tube for crimping the ends of said wrapper against the outermost coins as said rollers rotate the wrapped coins, means permitting a yielding movement of said crimpers during their crimping movement toward each other to accommodate varying thicknesses of the predetermined number of coins introduced as a unit into said tube, and means controlling the discharge of the packaged coins from said tube.

3. In a coin wrapping machine, the combination of a coin and wrapper receiving tube, a coin charging tube adapted to receive an unvarying predetermined number of coins and swingable from a coin receiving position to a coin charging position, means for swinging said charging tube to deposit said predetermined number of coins as a unit into said receiving tube, means for introducing a wrapper blank into said tube between the same and said coins and wrapping it about the coins in said receiving tube, means for crimping the ends of said wrapper against the outermost of the wrapped coins, said crimping means being yieldable to accommodate for varying thicknesses of coins introduced as a unit into said tube, and means controlling the discharge of the packaged coins from said tube.

4. In a coin wrapping machine, the combination of a coin and wrapper receiving tube, a coin charging tube adapted to receive a predetermined number of coins and swingable from a coin receiving position to a coin charging position, means for swinging said charging tube to deposit said predetermined number of coins as a unit into said receiving tube, a plurality of revoluble individually yieldingly mounted rollers bodily movable radially inwardly and outwardly of said tube on axes parallel to the axis of said tube and cooperating with said tube and with the coins to wrap a wrapper blank about the coins in said tube, means for crimping the ends of said wrapper against the outermost coins of said coin unit as said rollers rotate the wrapped coins, and means controlling the discharge of the packaged coins from said tube.

5. In a coin wrapping machine, the combination of a coin wrapper receiving tube, means for introducing a predetermined number of coins as a unit into said tube, a plurality of revoluble individually yieldingly mounted vertically disposed rollers bodily movable radially inwardly and outwardly of said tube on axes parallel to the axis of said tube and cooperating with said tube and with the coins to wrap a wrapper blank about the coins in said tube, means for crimping the ends of said wrapper against the outermost coins as said rollers rotate the wrapped coins, and means controlling the discharge of the packaged coins from said tube.

6. In a coin wrapping machine, the combination of a vertically disposed open ended coin and wrapper receiving tube, means for depositing by gravity an unvarying predetermined number of coins as a unit into said tube, withdrawable stop means at the lower end of said tube, means for introducing a wrapper blank into said tube between the same and said coins and wrapping it about said unit of coins, means for crimping the ends of the wrapper against the outermost coins of said unit of coins, said crimping means being yieldable to accommodate for varying thicknesses of coins introduced as a unit into said tube, and means for withdrawing said stop means after said coins have been packaged to permit gravity discharge thereof from said tube.

7. In a coin wrapping machine, the combination of a vertically disposed open ended coin and wrapper receiving tube, means for depositing by gravity a stack of a predetermined number of coins as a unit into said tube, a vertically movable and horizontally swingable stop at the lower end of said tube forming a support for said stack of coins, means for introducing a wrapper blank into said tube between the same and said coins and wrapping it about said unit of coins, means for crimping the ends of the wrapper against the outermost coins of said unit of coins, and mechanism for operating said stop including means for horizontally swinging said stop out of said tube after the coins have been packaged to permit gravity discharge thereof from said tube and means for bodily moving said stop vertically while in said tube.

8. In a coin wrapping machine, the combination of a coin and wrapper receiving tube, means for introducing a predetermined number of coins as a unit into said tube, a plurality of individually yieldingly mounted wrapping rollers, means for rotating said rollers, means for bodily moving said rollers radially inwardly and outwardly of said tube on axes parallel to the axis of said tube to wrap a wrapper blank about the coins in said tube and rotate said wrapped coins, bodily movable means distinct from said rollers for crimping the ends of said wrapper against the outermost coins as said rollers rotate the wrapped coins, said crimping means being yieldable to accommodate for varying thicknesses of coins introduced as a unit into said tube, and means controlling the discharge of the packaged coins from said tube.

9. In a coin wrapping machine, the combination of a coin and wrapper receiving tube, means for introducing a predetermined number of coins as a unit into said tube, means for introducing a wrapper blank into said tube between the same and coins, a plurality of wrapping rollers, means for continuously rotating said rollers, oscillatory supports for said rollers having their axes parallel to the axis of said tube, spring means associated with said supports for individually swinging said rollers radially inwardly to a wrapping position, cam means for swinging said rollers radially outwardly from engagement with the wrapped coins, bodily movable means distinct from said rollers for crimping the ends of said wrapper against the outermost coins as said rollers rotate the wrapped coins, and means controlling the discharge of the packaged coins from said tube.

10. In a coin wrapping machine, the combination of a coin and wrapper receiving tube, means for introducing a predetermined number of coins as a unit into said tube, a plurality of revoluble bodily movable rollers cooperating with said tube and with the coins to wrap a wrapper blank about the coins in said tube, means for rotating said rollers, means for moving said rollers radially in and out relative to said tube on axes parallel to the axis of said tube, oscillatory and reciprocatory crimpers engageable with opposite ends of the wrapper wrapped about said coins while the same are rotated by said rollers, means for operating said crimpers including means permitting a yielding movement of said crimpers during the crimping stroke of their reciprocatory movement to accommodate varying thicknesses of coins introduced as a unit into said tube, and means controlling the discharge of the packaged coins from said tube.

11. In a coin wrapping machine, the combination of a coin and wrapper receiving tubes, means for introducing a predetermined number of coins as a unit into said tube, a plurality of revoluble bodily movable rollers cooperating with said tube and with the coins to wrap a wrapper about the coins in said tube, means for rotating said rollers, means for moving said rollers radially in and out relative to said tube on axes parallel to the axis of said tube, oscillatory and reciprocatory crimpers engageable with opposite ends of the wrapper wrapped about said coins while the same are rotated by said rollers, cam means for oscillating said crimpers to move them into and out of operative position, cam controlled spring means for moving said crimpers toward each other during the crimping operation, and means controlling the discharge of packaged coins from said tube.

12. In a coin wrapping machine, the combination of a vertically disposed open ended coin and wrapper receiving tube, means for depositing by gravity a stack of a predetermined number of coins as a unit into said tube, a vertically movable and horizontally swingable stop member at the lower end of said tube, a plurality of vertically disposed wrapping rollers, means for rotating said rollers, means for bodily moving said rollers radially inwardly and outwardly of said tube on axes parallel to the axis of said tube to wrap a wrapper blank about the coins in said tube and rotate said wrapped coins, means for crimping the ends of said wrapper against the outermost coins of the wrapped stack of coins as said rollers rotate the same, and mechanism for operating said stop including means for swinging said stop out of said tube after the stack of coins has been packaged to permit gravity discharge thereof from said tube and means for bodily moving said stop vertically while in said tube.

13. In a coin wrapping machine, the combination of a vertically disposed open ended coin and wrapper receiving tube, a coin charging tube adapted to receive a predetermined number of coins and swingable from a coin receiving to a coin charging position, means for swinging said charging tube to deposit said predetermined number of coins as a unit into said receiving tube, withdrawable stop means movable radially into said tube and vertically movable relative to said tube to position said coins therein, a plurality of revoluble yieldingly mounted rollers cooperating with said tube and with the coins to wrap a wrapper blank about the coins in said tube, bodily movable means distinct from said rollers for crimping the ends of said wrapper against the outermost of the wrapped coins as said rollers rotate the same including crimping elements mounted for lengthwise yielding movement during crimping, and means for withdrawing said stop means from said tube after the coins have been packaged to permit gravity discharge thereof from said tube.

14. In a coin wrapping machine, the combination of a coin and wrapper receiving tube, means for depositing a stack of coins as a unit in said tube, means for introducing a wrapper blank into said tube between the same and said coins and wrapping it about said unit of coins, and means including lengthwise yieldably movable crimpers for crimping the ends of said wrapper against the outermost of the wrapped coins while in said tube.

15. In a coin wrapping machine, the combination of a vertically disposed open ended coin and wrapper receiving tube, a coin charging tube adapted to receive a predetermined number of coins, means for operating said charging tube to deposit said predetermined number of coins as a unit into said receiving tube, oscillatory and reciprocatory stop means movable out of and into said tube to position the coins therein and control gravity discharge of the wrapped coins therefrom, a plurality of revoluble rollers movable into cooperative relation with a wrapper and coins in said tube to wrap the wrapper about said coins, means for rotating said rollers, means for moving said rollers radially in and out relative to said tube on axes parallel to the axis of said tube, bodily oscillatory and reciprocatory crimpers engageable with opposite ends of the wrapper wrapped about said coins while the same are rotated by said rollers, cam means for oscillating said crimpers to move them radially into and out of operative position, and cam controlled spring means for moving said crimpers toward each other during the crimping operation.

16. In a coin wrapping machine, the combination of a coin and wrapper receiving tube, means for wrapping a stack of coins while in said tube comprising a plurality of individually yieldable mounted rotating rollers bodily movable radially inwardly and outwardly of said tube on axes parallel to the axis of said tube and cooperating with said tube and with the coins to wrap a wrapper blank about the coins in said tube.

17. In a coin wrapping machine, the combination of a coin and wrapper receiving tube in which a stack of coins are enclosed in a wrapper while in said tube, means for crimping the ends of the wrapper against the outermost coins of said stack comprising crimpers bodily movable radially inwardly and outwardly of said tube on axes parallel to the axis of said tube and bodily movable toward and away from each other during the crimping operation and mechanism for operating said crimpers including means permitting a yielding movement of said crimpers as they move toward each other to accommodate stacks of coins of varying over-all lengths.

18. In a coin wrapping machine, the combination of a coin and wrapper receiving tube in which a stack of coins are enclosed in a wrapper while in said tube, means for crimping the ends of the wrapper against the outermost coins of said stack comprising crimpers bodily movable radially inwardly and outwardly of said tube on axes parallel to the axis of said tube, spring means for bodily moving said crimpers toward each other during the crimping operation, and movable cam means for limiting the movement of said crimpers toward each other and for moving said crimpers away from each other to an inoperative position.

19. In a coin wrapping machine, the combination of a coin and wrapper receiving tube in which a stack of coins are enclosed in a wrapper whose ends are crimped over the coins while in said tube, a movable stop for holding the coins during the wrapping and crimping operations, means for swinging said stop inwardly and outwardly of said tube, and means for bodily moving said stop lengthwise of said tube while disposed within the same.

20. In a coin wrapping machine, the combination of a coin and wrapper receiving tube in which a stack of coins are enclosed in a wrapper whose ends are crimped over the coins during the wrapping and crimping operations, a movable stop for holding the coins during the wrapping and crimping operations, means for swinging said stop inwardly and outwardly of said tube, means for moving said stop lengthwise while in said tube, spring means for operating said swinging means for moving the stop inwardly and for operating said lengthwise moving means to move said stop upwardly, spring means for operating said lengthwise moving means for downward movement of said stop, and cam operated means for rendering said last named spring means operative and for operating said swinging means to move the stop outwardly of said tube.

21. In a coin wrapping machine, the combination of a coin and wrapper receiving tube, means for depositing a stack of a definite number of coins in said tube, means for introducing a wrapper blank into said tube between the same and said coins and wrapping it about said coins, crimpers disposable in said tube for movement lengthwise thereof, and means for imparting a variable stroke to said crimpers to accommodate stacks of coins having coins of varying thicknesses.

JENS JULIUS JORGENSEN.

References Cited in the file of this patent

UNITED STATES PATENTS

| Number | Name | Date |
| --- | --- | --- |
| 1,632,344 | Modlin | June 14, 1927 |
| 1,901,715 | Young | Mar. 14, 1933 |